United States Patent
Shimizu et al.

[11] Patent Number: 6,130,486
[45] Date of Patent: Oct. 10, 2000

[54] ENGINE OPERATED GENERATOR

[75] Inventors: Motohiro Shimizu; Masashi Nakamura; Tsutomu Hirano, all of Saitama, Japan

[73] Assignee: Honda Giken Kogyo Kabushiki Kaisha, Tokyo, Japan

[21] Appl. No.: 09/281,325

[22] Filed: Mar. 30, 1999

[30] Foreign Application Priority Data

Apr. 17, 1998 [JP] Japan .................................. 10-124104

[51] Int. Cl.$^7$ ....................................................... H02P 9/04
[52] U.S. Cl. .................. 290/40 C; 290/40 F; 290/40 A; 322/15
[58] Field of Search ................................ 290/40 R, 40 A, 290/40 B, 40 C, 40 F; 322/14, 15, 16

[56] References Cited

U.S. PATENT DOCUMENTS

| | | | |
|---|---|---|---|
| 4,119,861 | 10/1978 | Gocho | 290/13 |
| 5,229,929 | 7/1993 | Shimizu et al. | 363/98 |
| 5,239,253 | 8/1993 | Shimizu et al. | 322/25 |
| 5,473,228 | 12/1995 | Nii | 318/158 |
| 5,545,928 | 8/1996 | Kotani | 290/40 C |
| 5,650,713 | 7/1997 | Takeuchi et al. | 322/16 |
| 5,936,312 | 8/1999 | Koide et al. | 290/40 R |
| 5,945,808 | 8/1999 | Kikuchi et al. | 320/132 |
| 5,969,496 | 10/1999 | Yamada et al. | 318/715 |
| 5,994,881 | 11/1999 | Miyazaki et al. | 322/16 |

FOREIGN PATENT DOCUMENTS

| | | |
|---|---|---|
| 5-18285 | 1/1993 | Japan . |
| 5-146200 | 6/1993 | Japan . |

*Primary Examiner*—Nick Ponomarenko
*Attorney, Agent, or Firm*—Armstrong, Westerman, Hattori, McLeland & Naughton

[57] ABSTRACT

An engine operated generator is arranged to constantly respond to a change in the load with a margin of power. The output current of the generator 1 driven by an engine 2 is rectified by a converter 3 composed of a thyristor bridge structure. A direct current released from the converter 3 is converted by an inverter 4 to an alternate current at a commercial frequency and connected to a load 5. A thyristor driver circuit 9 controls the conduction of thyristors so that the voltage at the input of the inverter 4 is constant. A fuel flow controller 10 detects the conduction angle of the thyristors and the revolution of the engine 2 is controlled so that the conduction angle is converged on a target conduction angle. Since the target conduction angle is set within a predetermined range smaller than the maximum conduction angle, the generator is maintained with margins of its output and can thus provide a stable level of voltage and respond quickly to a change in the load.

6 Claims, 2 Drawing Sheets

ENGINE OPERATED GENERATOR

BACKGROUND OF THE INVENTION

1. Field of the Invention

The present invention relates to an engine operated generator and particularly, to an engine operated generator capable of controlling the revolution of an engine depending on the magnitude of load.

2. Description of the Related Art

Engine operated generators for use as an AC (alternative-current) power sources have been known which employ inverters to stabilize the output frequency. Such an engine operated generator is joined to and driven by an engine to generate an AC power which is converted into a DC power and then returned back by the inverter to desired AC power of a commercial frequency. The engine operated generator equipped with the inverter permits its output frequency to hardly depend on the revolution of the engine and can thus control the engine revolution with the magnitude of load to determine its output.

For example, an inverter-equipped engine operated generator is disclosed in Japanese Patent Laid-open Publication Hei 5-18285 which detects a load from the output current of the inverter and uses its detected value to perform throttle control on the engine. That control technique allows the output voltage to be maintained substantially constant regardless of variations of the load.

For controlling the engine revolution to an optimum rate depending on the magnitude of load, it is essential that the load stays within the generation capability of the generator. However, the optimum rate of the revolution corresponding to the magnitude of the load has to be calculated using various parameters, for example, effective output power of the inverter (that is, voltage×current×power factor), inversion efficiency of the inverter, power generation capability per revolution, and tolerances of the generator and the effective power detector, hence making the control very difficult and complicated.

Another engine operated generator is proposed (as disclosed in Japanese Patent Laid-open Publication Hei 5-146200) where the output voltage of the generator is detected at an input of an inverter and compared with a predetermined reference voltage to determine a corresponding rate of the engine revolution to the load.

The disadvantage of the above two conventional engine operated generators is that once the output voltage of the generator has been declined by overload which exceeds an output corresponding to the current revolution of the engine, the recovery of the engine revolution to a target rate is significantly delayed.

Also, there is a time lag from the throttle opening action, which is performed on the basis of a difference between the detected output current or voltage and a target level, to the release of its corresponding output from the generator. This causes the engine operated generator to hardly respond to a quick change in the load and leave the output voltage without stability.

SUMMARY OF THE INVENTION

It is an object of the present invention to provide an engine operated generator of which the capability of power generation is constantly adapted with a margin for electric loads widely varying thus to control the output voltage with stability.

An engine operated generator according to the present invention comprises: a converter composed of semiconductor rectifier devices for rectifying an output current of a generator driven by an engine; an inverter for converting a direct current released from the converter into an alternate current at a given frequency; a semiconductor rectifier device driver circuit for controlling a conduction angle of the semiconductor rectifier devices to converge the output voltage of the converter to a target value; a conduction angle detecting means for detecting the conduction angle of the semiconductor rectifier devices; a target conduction angle setting means for setting a degree smaller than the maximum conduction angle as a target of conduction angle; and an engine revolution controlling means for controlling the revolution of the engine so that detected degrees of the conduction angle measured by the conduction angle detecting means are converged on the target of conduction angle.

As the conduction angle of the semiconductor rectifier devices is controlled to be converged on the target conduction angle set smaller than the maximum conduction angle, it can be easily increased as respond to any increase of the load. More particularly, the generator always runs with a margin in its output and can quickly respond to the increase of the load within the margin. Also, a change in the revolution of the engine will be prevented from affecting the output voltage.

DETAILED DESCRIPTION OF THE PREFERRED EMBODIMENTS

Figure 1:
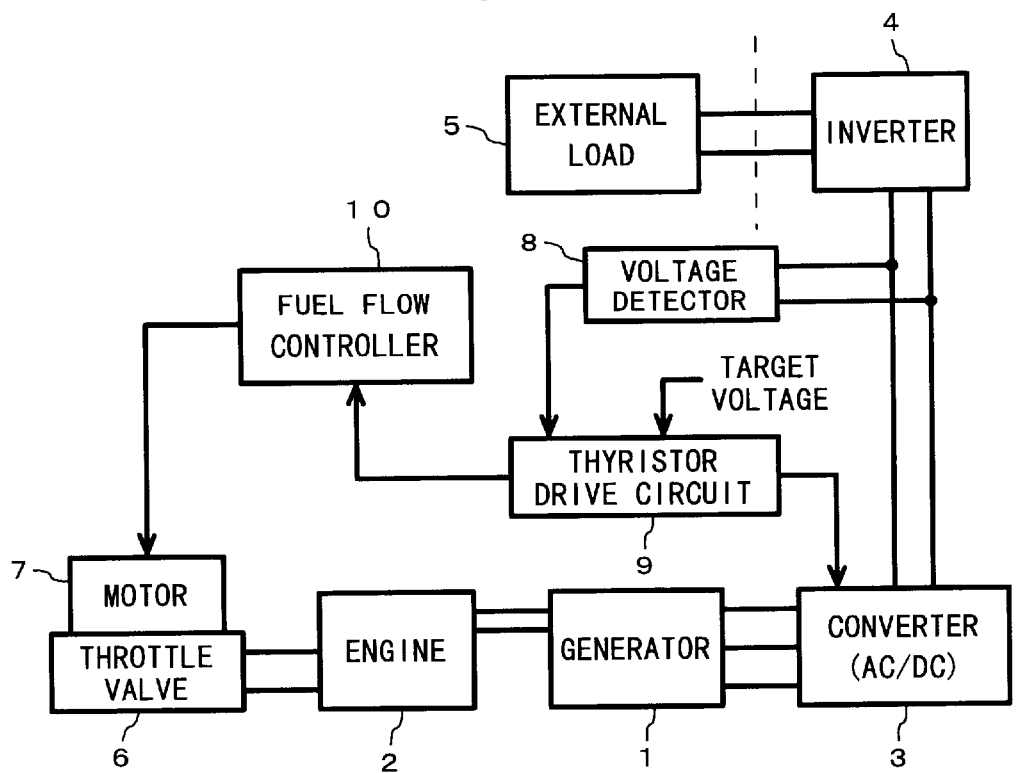
FIG. 1 is a block diagram of a systematic arrangement of an engine operated generator according to one embodiment of the present invention.

One embodiment of the present invention will be described in more detail referring to the drawings. FIG. 1 is a block diagram showing a schematic arrangement of an engine operated generator of the embodiment. The (internal combustion) engine 2 is connected to a multi-pole magnetic generator 1 (referred to as a generator hereinafter). The generator 1 is driven by the engine 2 to generate multi-phase (typically, three-phase) AC output.

The AC output is converted into a DC output by the full-wave rectifying operation of a converter 3 which comprises a rectifier circuit having a group of semiconductor rectifier devices or thyristors connected in a bridge form. The DC output is supplied to an inverter 4 which supplies a single-phase AC at a commercial frequency (e.g. 50 Hz) to an external load 5 connected to the output thereof. A stepping motor 7 is provided for controlling the opening of a throttle valve 6 of the engine 2. More particularly, the opening of the throttle valve 6 is controlled by the number of pulses supplied from a fuel flow controller 10 to the stepping motor 7, thus controlling the revolution of the engine 2. The engine 2 may be of fuel injection type of which the revolution is controlled by a duration of fuel injection instead of the throttle opening.

A voltage detector 8 detects the output voltage of the converter 3. A thyristor driver circuit 9 compares the output voltage with a predetermined target voltage (for example, 170 volts) and controls a conduction phase of the thyristors in the converter 3 by a known manner so that the output voltage of the converter 3 is converged on the target voltage. Accordingly, the output voltage of the converter 3 can be maintained to the target voltage within a specific range which corresponds to a controllable range of the conduction angle of the thyristors.

Figure 2:
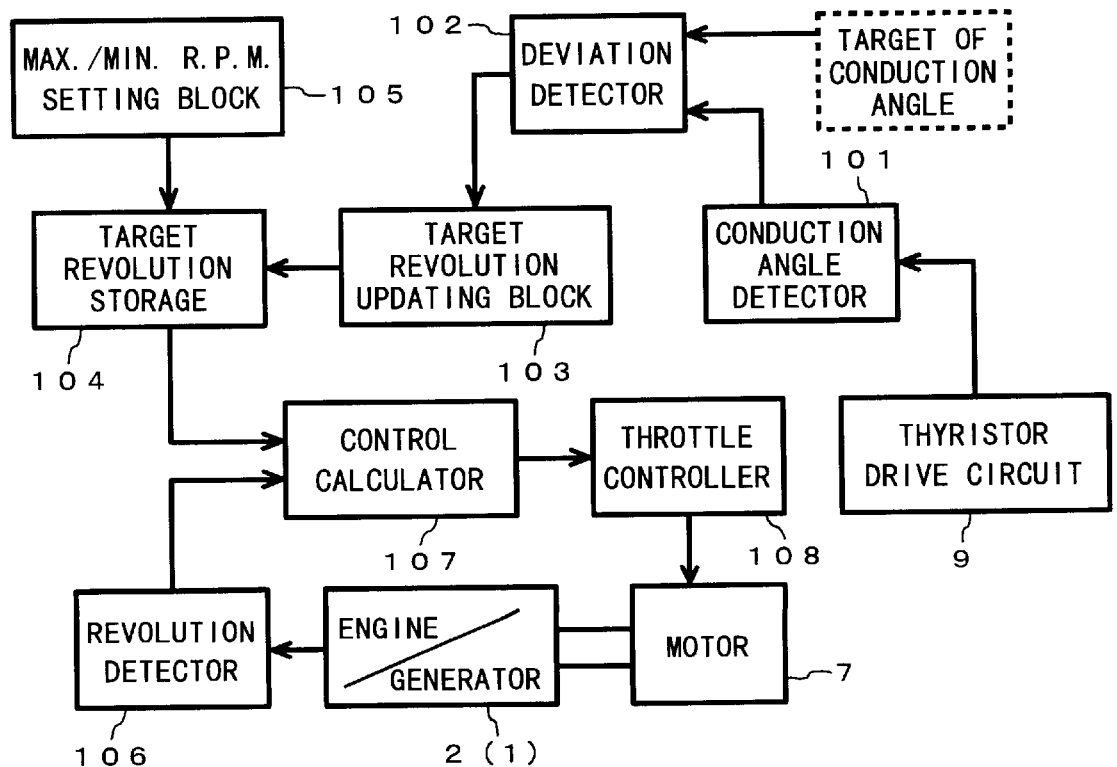
FIG. 2 is a block diagram showing primary components of a fuel flow controller in the engine operated generator.

FIG. 2 is a block diagram showing a function of the fuel flow controller 10. A thyristor conduction angle detector 101 detects the conduction angle on the basis of a control signal supplied from the thyristor driver circuit 9 to the converter 3. The conduction angle is continuously measured at predetermined periods to have an average. The average conduction angle may preferably be determined from a moving average of consecutive data (e.g. of 10 times).

The average conduction angle determined by the thyristor conduction angle detector 101 is then supplied to a deviation detector 102 for detecting a deviation from the target conduction angle. The deviation is used to judge whether or not the generator 1 runs with ample margins of its output. For that purpose, the target conduction angle may be set to 80 percent. It is preferred that the target conduction angle is hysteretic as in a common control parameter. The target conduction angle may be a fixed value or may be varied depending on the temperature of the engine 2. For example, when the temperature of the engine 2 is low, the target conduction angle is set at a small degree. In this manner, the engine 2 is favorably controlled in the revolution so that the deviation detected by the deviation detector 102 is zero and can thus be maintained in its generous state.

Figure 3:
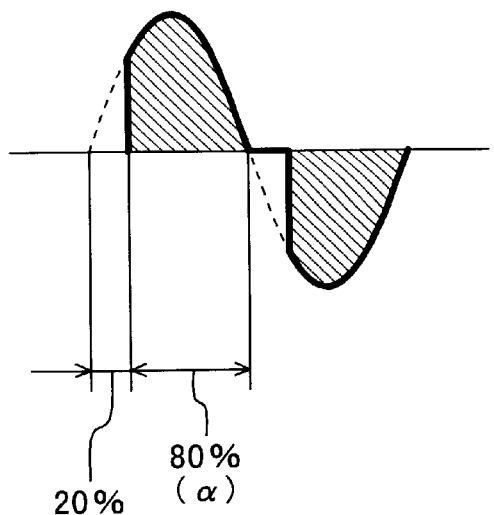
FIG. 3 is an explanatory view showing conduction angles of a thyristor.

FIG. 3 illustrates a waveform of thyristor output voltage in the converter 3 with the conduction angle set to 80 percent. As shown, the conduction angle a is an electrical angle corresponding to a duration when the thyristors are conductive and is determined by a known appropriate means.

Figure 4:
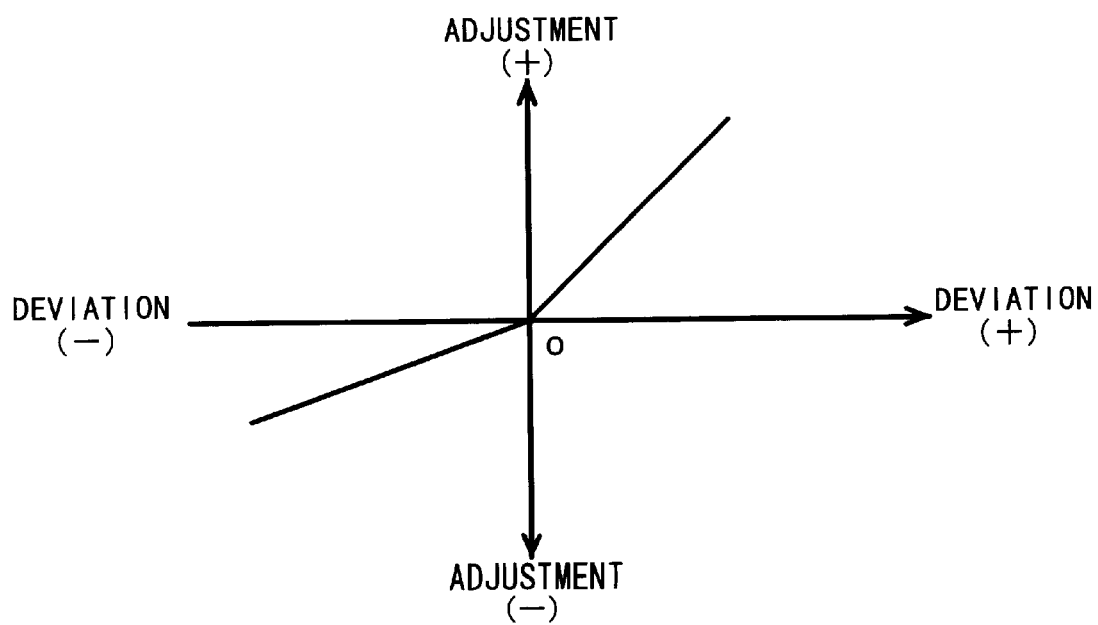
FIG. 4 is a diagram showing the relation between a deviation in the conduction angle of thyristors and a target revolution adjustment.

A target revolution updating block 103 is responsive to the deviation received from the deviation detector 102 to generate and deliver an engine revolution adjustment. The block 103 may have a table using the deviation as readout address to output the engine revolution adjustment. FIG. 4 shows the relationship between the deviation and the engine revolution adjustment. The deviation is a shift of the real conduction angle from the target conduction angle as expressed by (real conduction angle—target conduction angle). As shown, the engine revolution adjustment over the deviation is set greater when the deviation is positive than when negative. When the deviation is positive, the conduction angle is larger than the target conduction angle (80%). It is thus judged that the generator 1 is marginal and prompt output increase response of the generator 1 to the load is required. When the deviation is negative, it is judged that the generator 1 has a generous margin. It is hence desired to avoid any frequent change in the revolution which may result from overshoot due to the excessive response.

Returning to FIG. 2, a target revolution storage 104 adds the engine revolution adjustment received from the target revolution updating block 103 to the target revolution, which has been saved therein, in order to have a new target revolution. The target revolution is updated while not departing from the range of engine revolution between maximum and minimum which has been determined by a maximum/minimum revolution setting block 105. More particularly, in case that the target revolution calculated by adding the engine revolution adjustment departs from the range, the maximum or minimum of the range is assigned as a new target revolution. The minimum range is used because the conduction angle of the thyristors particularly at a lower rate of the revolution may be susceptible to every small change in the revolution. As such drawback is avoided, the stable revolution of the engine can be ensured without or with a small load.

A revolution detector 106 detects the revolution of the generator 1. A control calculator 107 calculates a control, which suppresses the deviation of the real revolution from the target revolution to zero, from the real revolution received from the revolution detector 106 and the target revolution read out from the target revolution storage 104, using a known appropriate method (for example, proportion, integral, and differential calculation). A throttle controller 108 includes a stepping motor 7 and generates a train of pulses for driving the stepping motor 7 corresponding to the control received from the control calculator 107. The stepping motor 7 rotates in response to the pulses to change the throttle opening.

As set forth above, the revolution of the engine 2 according to the present invention is controlled so that the average conduction angle in the thyristor bridge circuit for controlling the output of the converter 4 stays at about its predetermined degree (e.g. 80%).

Accordingly, the generator 1 can always run with generous margins of its output to supply electric power with the load. More specifically, when the load is increased, the conduction angle of the thyristors increases in response to a down change in the output voltage of the converter 3 to offset the increase of the load. As the conduction angle increases, the revolution of the engine 2 is increased with a comparatively moderate rate. As a result, the engine revolution can be eased in the frequent change, thus contributing to the reduction of the engine noise and the fuel consumption.

In the embodiment of the present invention, the output voltage of the generator is detected at the input of the inverter. This eliminate the requirement of calculation of the optimum rate of revolution of the generator and/or engine using the effective output and the conversion efficiency of the inverter, the capability of power generation per revolution, and variations of the components in the generator and the effective power detector as parameters and makes the control operation simple. Although the converter described above employs of thyristor bridge type for rectifying the output current of the generator, it may be any other appropriate voltage control device such as a DC—DC voltage converter.

It is now apparent from the above description of the present invention that the revolution of the engine is controlled through monitoring and maintaining a margin of the power generation and can thus respond quickly to a change in the load within its predetermined margin of the power generation. Also, the revolution of the engine is adapted to the engine load depending on the magnitude of the electric load hence minimizing the engine noise and the fuel consumption. Moreover, since the conduction angle of the thyristors (typically, semiconductor rectifier devices) in the converter is maintained at its predetermined range, the margin in the output of the generator can be ensured without difficulty.

What is claimed is:
1. An engine operated generator comprising:
   a converter composed of semiconductor rectifier devices for rectifying an output current of a generator driven by an engine;

an inverter for converting a direct current released from the converter into an alternate current at a given frequency;

a semiconductor rectifier device driver circuit for controlling a conduction angle of the semiconductor rectifier devices to converge the output voltage of the converter to a target value;

a conduction angle detecting means for detecting the conduction angle of the semiconductor rectifier devices;

a target conduction angle setting means for setting a degree smaller than the maximum conduction angle as a target conduction angle; and an engine revolution controlling means for controlling the revolution of the engine so that detected degrees of the conduction angle measured by the conduction angle detecting means are converged on the target of the conduction angle.

2. An engine operated generator according to claim 1, further comprising:

a deviation detecting means for detecting a deviation of the conduction angle detected from the target conduction angle, wherein the engine revolution controlling means controlling the revolution of the engine so that the deviation is minimized.

3. An engine operated generator according to claim 1, wherein the conduction angle detecting means calculates a moving average of the conduction angles detected as the conduction angle.

4. An engine operated generator according to claim 2, wherein the engine revolution controlling means decreases the revolution of the engine when a subtraction of the target conduction angle from the detected conduction angle measured by the deviation detecting means is negative and increases the same when the subtraction is positive.

5. An engine operated generator according to claim 4, wherein a rate of change of the revolution of the engine is greater at an increase than at a decrease thereof.

6. An engine operated generator according to claim 1, wherein the target conduction angle is related to the temperature of the engine and it is set at a small degree when the temperature is lower and at a large degree when the temperature is higher.

* * * * *